No. 610,235. Patented Sept. 6, 1898.
O. I. HOWE.
FORE PART FOR BOOT OR SHOE TREES.
(Application filed Mar. 12, 1897.)
(No Model.)
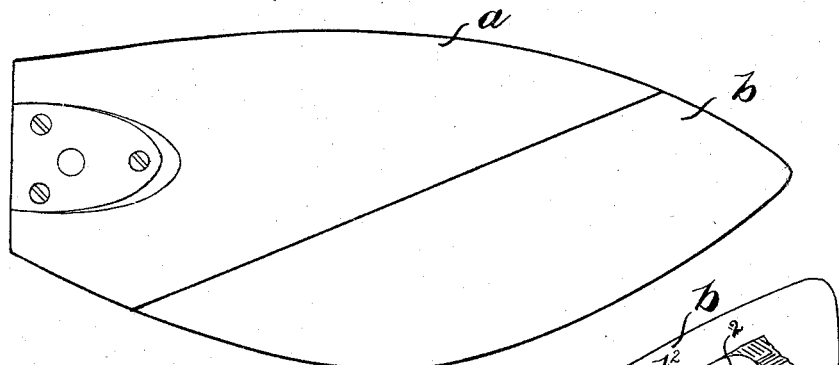
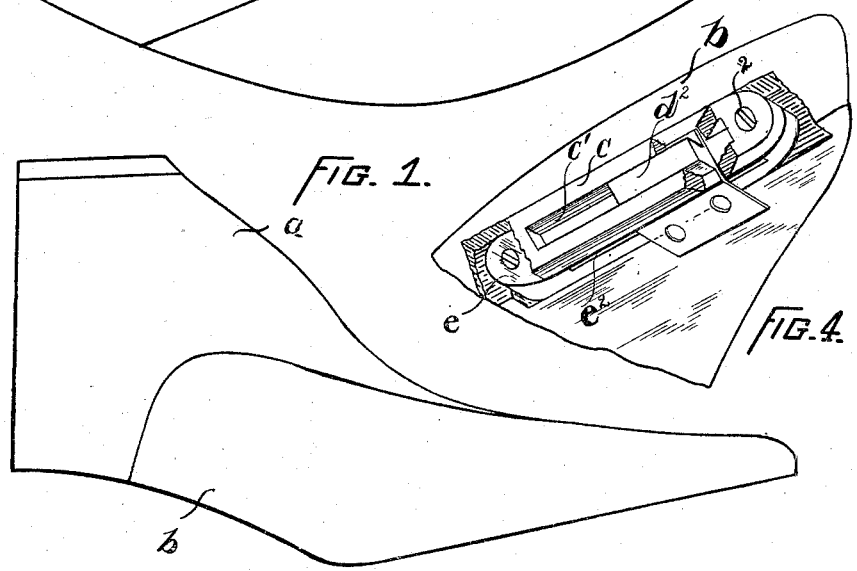
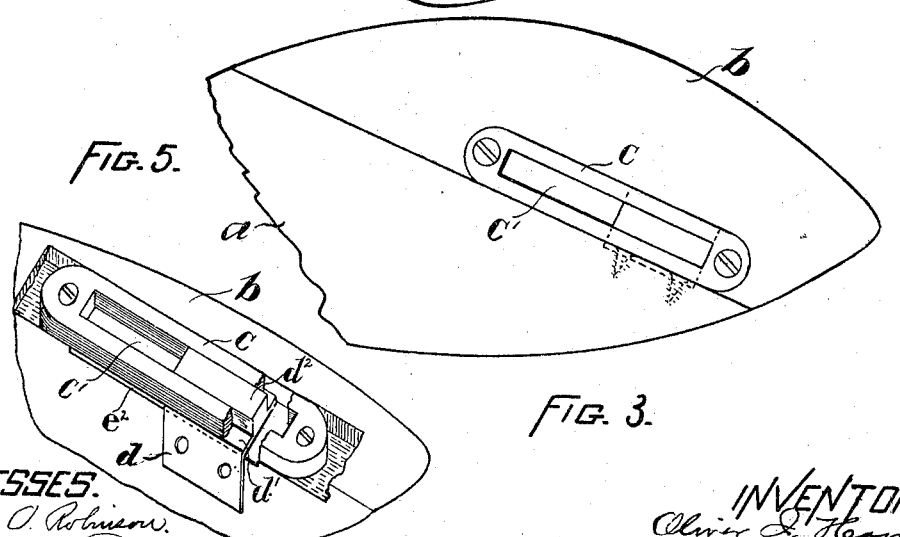
WITNESSES.
Harry O. Robinson.
Arthur F. Randall.
INVENTOR.
Oliver I. Howe
by B. J. Noyes
atty.

UNITED STATES PATENT OFFICE.

OLIVER I. HOWE, OF BEVERLY, MASSACHUSETTS, ASSIGNOR, BY MESNE ASSIGNMENTS, TO THE MORLEY FINISHING MACHINE COMPANY, OF MAINE.

FORE PART FOR BOOT OR SHOE TREES.

SPECIFICATION forming part of Letters Patent No. 610,235, dated September 6, 1898.

Application filed March 12, 1897. Serial No. 627,204. (No model.)

*To all whom it may concern:*

Be it known that I, OLIVER I. HOWE, of Beverly, in the county of Essex and State of Massachusetts, have invented an Improvement in Fore Parts for Boot or Shoe Trees, of which the following description, in connection with the accompanying drawings, is a specification, like letters on the drawings representing like parts.

In United States Letters Patent No. 543,148, dated July 23, 1895, a detachable foot-piece, commonly called a "split fore part," is shown, it being adapted to be used in a treeing or shaping machine for boots and shoes. In the split foot-piece or fore part therein shown a sliding side piece is made to slide out and in on a body part, and the connection between said parts is placed upon their abutting or sliding faces and is thereby totally concealed. In applying a sliding connection to the abutting or sliding faces one of the parts or members of said connection is attached to the body part and the other part or member to the sliding part, and the part or member which is attached to the sliding part is held in place by a screw which passes through said sliding part from the outside, and the hole through which the screw passes is thereafter filled with a wooden plug and finished over. In case anything happens and it becomes necessary to separate the parts of the split foot-piece or fore part having a sliding connection on their abutting or sliding faces said plug is removed and then the screw, and even when necessary to adjust the parts removal of the plug is necessary, and as a consequence the sliding connection, located as shown in said patent, is undesirable.

This invention has for its object to provide a split foot-piece or fore part—such, for instance, as represented in said patent—with an improved or novel form or construction of sliding connection for the parts whereby the above-noted objections are overcome, enabling the parts to be quickly separated whenever desired and also enabling adjustment of the sliding connection at any time without separating the parts, and it also has for its object to simplify the construction of the sliding side piece of the foot-piece and to limit its inward movement.

The invention consists in certain details of construction, which will be hereinafter pointed out and claimed.

Figure 1 shows in side elevation a foot-piece or fore part embodying this invention; Fig. 2, a plan view of the same; Fig. 3, an under side view of the same; Fig. 4, a perspective view of the sliding side piece of the foot-piece or fore part and the sliding connection, the members of which are in engagement with each other. Fig. 5 is a perspective view of a modification to be referred to.

The foot-piece or fore part herein shown consists, essentially, of the body part $a$ and sliding side piece $b$, said parts being separated on a line extending from at or near the shank diagonally to a point at or near the toe and preferably at the opposite side thereof, so that the sliding side piece includes the whole toe. The line of severance is straight from end to end and extends from top to bottom of the foot-piece or fore part. The sliding connection of said parts is located at the bottom or sole surface of the fore part, so as to be accessible at all times, and consists of two essential parts, one on the body part and the other on the sliding side piece, said parts engaging and coöperating with each other. One part or member of said sliding connection consists of a T-shaped guide-block which is set edgewise relatively to the part to which it is attached, so as to project laterally therefrom, and, as herein shown, said guide-block is secured to the body part $a$. The T-shaped guide-block is formed with a rib $d^2$ and with portions $d'$ $d'$ projecting laterally therefrom in opposite ways, and a base-plate $d$ is provided which may be formed integral with said guide-block, but which is turned at right angles thereto, so as to lie flat against the abutting face of the body part $a$ when the guide-block is disposed to project laterally therefrom, and said base-plate is secured in position by screws or otherwise. The guide-block is secured to the abutting face of the body part $a$ close to its sole-face. The other part or member of said sliding connection consists of a guideway adapted to receive said guide-block, and said guideway is herein shown as attached to the sole-face of the sliding side piece $b$. The guideway, as shown in Fig. 4, consists of two plates $c$ and $e$, made narrow and quite long and placed one upon the other and set in a recess formed or provided for them in the sole-face of the side piece $b$ at the abutting face thereof. The plate $c$ has a slot $c'$ extending nearly from end to end thereof, which is made of a width to receive the rib $d^2$ of the guide-block and permit it to slide or work freely therein, and the plate $e$ is formed or provided with a raised portion at each end, upon which the plate $c$ rests, such raised portions elevating the plate $c$, so as to produce along its under side a slot or passage $c^2$ of the full width of the plates, which is adapted to receive the laterally-projecting portions $d'$ $d'$ of the guide-block. The two plates $c$ and $e$ are or may be secured together and to the sole-face of the part $b$ by screws passing through holes in the ends thereof and into said piece $b$ and may therefore be readily removed whenever desired. The guideway thus formed by the plates $c$ and $e$, located, as shown, on the sole-face of the part or piece $b$, and at the abutting face thereof, will present a slot or opening $e^2$ along the abutting face which serves as the entrance slot for the guide-block. In assembling the parts the plate $e$ will be placed in the recess in the part $b$ and the guide-block which is attached to the part $a$ will be placed thereon, and then the plate $c$ will be applied, the rib of the guide-block entering the slot $c'$ of said plate $c$, and the parts thus assembled will then be secured in place by the screws 2 or otherwise. When the parts are thus assembled, it will be observed that the T-shaped guide-block occupies a position in the guideway and is adapted to slide freely therein back and forth, and that to separate the parts it is only necessary to remove the plate $c$ from the sole-face of the part or piece $b$.

The guide-piece $d'$ $d^2$ is made of a length to insure a good and sufficent bearing for the sliding side piece $b$ to prevent said piece from wabbling or turning relative to the part $a$. The ends of the slots limit the movement of the sliding side piece $d$ in each direction.

It is obvious that the positions of the parts of the sliding connections may be changed—i. e., the plates formed to present the slots $c'$ and $e^2$ may be set into the sole-surface of the body part, while the laterally-projecting guide-piece may be secured to the sliding side piece. This foot-piece or fore part is simple to construct, and the sliding connection is simple to make, easy to secure in position and to adjust, and owing to its accessibility, incident to its location at the bottom or sole surface of the fore part, the parts may be separated at any time and tightened if for any reason the connection works loose.

It is also obvious that the plates $c$ and $e$ may be made integral; but for cheapness of construction it is preferable to make them separate, and hence I desire it to be understood that I deem such integral construction as an equivalent of the separate plates, as in such case a guideway is formed adapted to receive the T-shaped guide-piece.

It is furthermore obvious that the base-plate $e$ may be omitted and the bottom of the recess adapted to serve as the base and to form one side of the lateral slot $e^2$, as shown in Fig. 5, and hence I desire it to be understood that my invention includes such construction, as a guideway is likewise herein formed adapted to receive the T-shaped guide-block.

Instead of having that slot of the guideway which is herein referred to as on the sole-surface made to open out of the sole-surface, so that the guide-rib which follows along said slot may be observed from the outside, it is obvious that such slot may be made as a groove in the under side or inside of said plate $c$ instead of through it and substantially the same results produced, said slotted, or it may be grooved, plate $c$ being removable from the sole-surface.

As the end of one or both slots serves as a limiting-stop against which the sliding guide-piece strikes to limit the inward movement of the sliding side piece, no shoulder or other rear abutment is necessary, and as a consequence the line of severance may be made straight from end to end and may extend nearly to the rear end of the body part.

I claim—

1. The foot-piece or fore part herein described consisting of the body part $a$, sliding side piece $b$, and a sliding connection at the sole-surface connecting said parts consisting of the laterally-projecting T-shaped guide-block on the abutting face of one part, a guideway on the other part, having a T-shaped slot for said guide-piece and also having an entrance-slot at the side thereof.

2. The foot-piece or fore part herein described, consisting of the body part $a$, sliding side piece $b$, and a sliding connection for said parts consisting of a laterally-projecting guide-piece on the abutting face of one part and a guideway for it on the sole-surface of the other part having an entrance-slot $e^2$, at the abutting face.

3. The foot-piece or fore part herein described, consisting of the body part $a$, sliding side piece $b$, and a sliding connection for said parts consisting of a laterally-projecting guide-piece on the abutting face of one part and a guideway for it on the other part at the sole-surface, having as a coöperative part of it the removable plate $c$, which is secured to said sole-surface.

4. The foot-piece or fore part herein described, consisting of the body part $a$, sliding side piece b, and a sliding connection for said parts consisting of a laterally-projecting guide-piece on the abutting face of one part and a guideway for it on the other part at the sole-surface consisting of the plates c and e formed to present a slot to receive said guide-piece and an entrance-slot.

In testimony whereof I have signed my name to this specification in the presence of two subscribing witnesses.

OLIVER I. HOWE.

Witnesses:
B. J. NOYES,
HARRY O. ROBINSON.